E. G. LATTA.
TYPE WRITING MACHINE.
APPLICATION FILED OCT. 6, 1915.

1,264,945.

Patented May 7, 1918.
4 SHEETS—SHEET 3.

Inventor.
Emmit G. Latta.
By Wilhelm & Parker
Attorneys.

E. G. LATTA.
TYPE WRITING MACHINE.
APPLICATION FILED OCT. 6, 1915.

1,264,945.

Patented May 7, 1918.
4 SHEETS—SHEET 4.

Inventor
Emmet G. Latta
by Wilhelm & Parker
Attorneys.

UNITED STATES PATENT OFFICE.

EMMIT G. LATTA, OF SYRACUSE, NEW YORK, ASSIGNOR TO CORONA TYPEWRITER COMPANY, INC., A CORPORATION OF NEW YORK.

TYPE-WRITING MACHINE.

1,264,945.   Specification of Letters Patent.   Patented May 7, 1918.

Original application filed November 2, 1911, Serial No. 658,153. Divided and this application filed October 6, 1915. Serial No. 54,422.

*To all whom it may concern:*

Be it known that I, EMMIT G. LATTA, a citizen of the United States, residing at Syracuse, in the county of Onondaga and State of New York, have invented a new and useful Improvement in Type-Writing Machines, of which the following is a specification.

This invention relates to improvements in typewriting machines, and has for its object to produce an efficient and desirable tabulating mechanism for typewriting machines which is of compact and simple construction; and also to combine the tabulating mechanism with line locking, line spacing and margin releasing mechanisms, so that the same parts perform more than one function, and so that the several parts are arranged within less space than is usually required and can be provided at less cost.

This application is a division of application, Serial No. 658,153, filed by me Nov. 2, 1911, and the improvements are herein shown and described in connection with the collapsible typewriter disclosed in said application, but the improvements herein claimed are not restricted in application to collapsible typewriting machines.

In the accompanying drawings, consisting of four sheets.

The machine herein shown and described is the same in construction as that disclosed in said prior application, but only such parts thereof are illustrated and described herein as are necessary to a correct understanding of the invention claimed.

A and A' represent respectively the stationary and movable sections of the collapsible main frame; B the platen carriage consisting of end plates $b$ $b'$ connected by a front bar $b^2$, a rear bar $b^3$ and bottom bars $b^4$, $b^5$ and arranged to travel crosswise of the machine on an anti-friction guide track $b^8$ on the rear cross bar $b^9$ of the frame A'; $b^{10}$ the platen journaled on the ends of the carriage; C one of the type bars which are pivotally mounted on the segment C' so as to swing upwardly and rearwardly to make the impressions at the front side of the platen; and E the universal bar which is arranged to be struck by the type bars as they approach the platen, and which, as usual, is connected to the carriage escapement, so as to cause a letter space movement of the carriage each time a type bar is actuated to make an impression. The universal bar consists of a curved strip having two parallel rigidly connected rearwardly extending arms $e$ which are pivoted to the lower ends of two pairs of downwardly extending arms $e'$ $e^2$. These arms are rigidly attached at their uper ends to the ends of a pair of parallel rock shafts $e^3$ $e^4$ which are suitably journaled to lugs on a bracket $e^5$ which is secured in any suitable manner to the rear cross bar $b^9$ of the movable frame A'. One of the arms $e^2$, see Fig. 3, has an auxiliary arm $e^7$ pivoted thereto and extending rearwardly to a pivotal connection with an upright link $e^8$ which is connected at its upper end to the escapement lever G' of the carriage escapement, so that the escapement is actuated by the operation of the universal bar.

G represents the toothed escapement wheel of the carriage escapement and $g'$ the feed pinion connected thereto.

H represents the rack bar with which the feed pinion meshes. The rack bar is made of a rectangular bar of substantially the length of the carriage with the rack teeth projecting downwardly from the forward portion of its lower edge. The front and rear faces of the bar are provided with opposing slots for the reception of the margin and tabulator stops hereafter described. The ends of the rack bar are secured to the rear ends of supporting levers $h$ and $h'$ which are pivotally mounted on the opposite ends of the carriage. These levers preferably have inwardly extending rear ends which are riveted in slots at the ends of the rack bar. The levers $h$ and $h'$ are pivoted by screws $h^2$ or otherwise to the ends of the carriage and are provided with slots $h^3$ concentric with their pivots in which screws or pins $h^4$, attached to the ends of the carriage, extend to limit the up and down movements of the rack bar. The forward end of the lever $h$ extends under the adjacent end of the platen shaft and upwardly and outwardly in front thereof in position to be engaged and actuated by the line space lever, presently described. A spring $h^5$ connected to the lever $h$ and to the adjacent end of the carriage acts to yieldingly hold the rack bar in the normal position shown, in which it meshes with the feed pinion.

Figure 1:
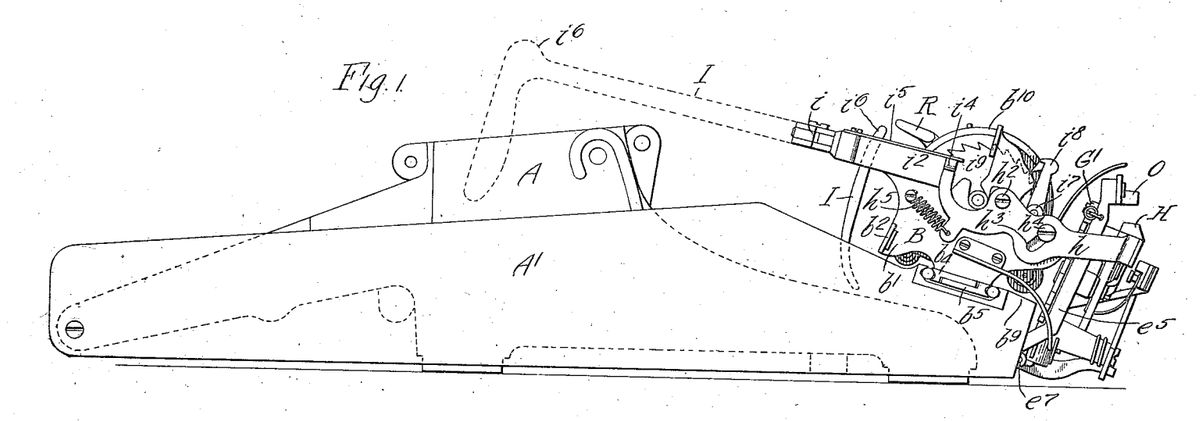
Figure 1 is a fragmentary side elevation of a typewriting machine embodying the invention, showing the same collapsed.
Figure 2:
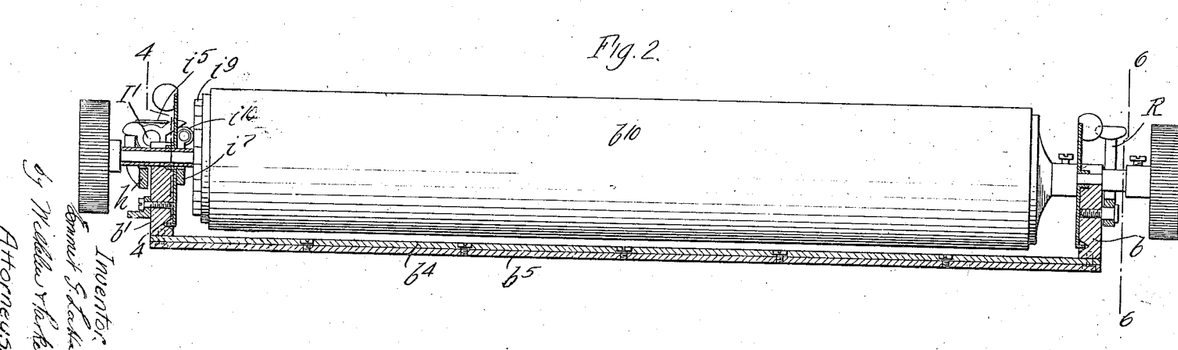
Fig. 2 is a rear sectional elevation of the platen carriage and platen.
Figures 7, 8:
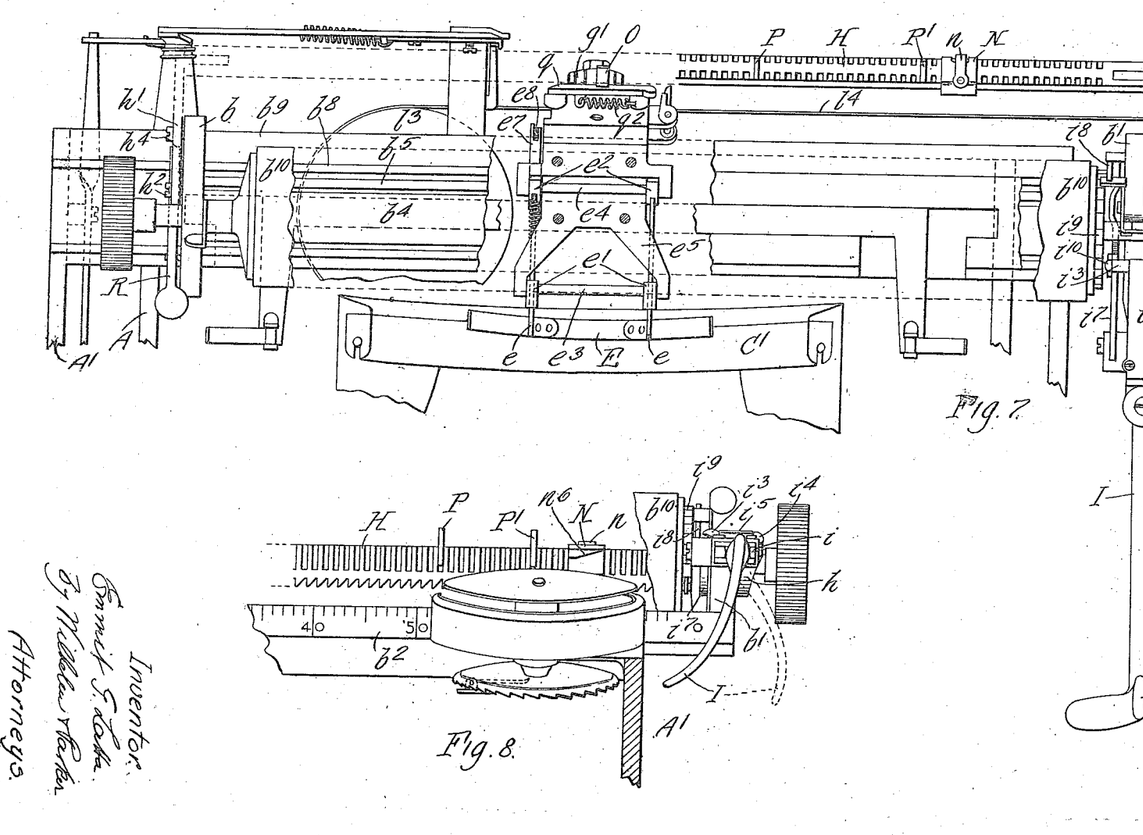
Fig. 7 is a fragmentary plan view of the machine, portions of the carriage and other parts being broken away to disclose the underlying parts.
Fig. 8 is a fragmentary transverse sectional elevation of the machine on line 8—8, Fig. 3, portions of the carriage being broken away to disclose parts at the rear thereof.

The line space lever, as shown, consists of an outer or handle portion I and a rear journal portion I', to which the handle portion is connected by a hinge joint $i$ which permits the handle part to be swung forwardly into the operative position shown in Fig. 7 and indicated by broken lines in Fig. 1, or to be folded inwardly in front of the platen when the machine is to be collapsed. For machines of ordinary construction which do not collapse, a non-folding line space lever can be used.

The line space lever projects forwardly from the right hand end of the carriage on which its rear portion I' is journaled in a bearing $i^2$, and the front end of the lever extends downwardly forming a handle by which the lever can be rocked a limited distance in opposite directions. At its rear end the lever part I' is provided with a T-head which forms inwardly and outwardly projecting arms or parts $i^3$ and $i^4$. A leaf spring $i^5$, secured at its forward end to the bearing $i^2$, rests at its free rear end on the flat top of the cross head and acts to return the line space lever to the normal position when released after being rocked in either direction.

The downturned end of the handle of the lever is suitably shaped to be pushed to the right by the thumb of the right hand in the usual way, and also to be grasped by the thumb and fingers and turned to the left, the thumb in this case being placed against a rest or projection $i^6$ and acting to hold the carriage against movement, or to control its movement by its driving spring, as will be explained later. $i^7$ represents an auxiliary lever or pawl carrier which is suitably pivoted at its front end in a lug on the inside of the bearing extension $i^2$ of the end of the carriage and extends rearwardly beneath the platen shaft. A line space pawl $i^8$ is pivoted at its lower end to the rear end of the auxiliary lever and is provided at its upper end with an inwardly projecting tooth or part adapted to engage the teeth of a line space wheel $i^9$, secured to the adjacent end of the platen for turning the latter. The inwardly projecting arm $i^3$ of the line space lever overhangs and is adapted to engage an anti-friction roller $i^{10}$ suitably journaled on the auxiliary lever, so that by rocking the line space lever by pushing the depending handle to the right, the auxiliary lever and pawl are actuated to turn the line space wheel and platen.

A concealed spring returns the auxiliary lever and pawl to their normal positions and at the same time the line space lever is returned by its spring $i^5$. The outwardly projecting arm $i^4$ of the line space lever projects over the front end of the rack bar supporting lever $h$ so that by rocking the line space lever in the opposite direction, that is by pulling its depending handle to the left, the rack bar is raised out of mesh with the feed pinion and the carriage will be pulled to the left by its driving spring as far as permitted by the operator.

The first effect of such movement of the line space lever is to release the carriage from its feed mechanism and permit it to be moved in either direction, to the right by means of this line space lever, and to the left by its driving spring, controlled by pressure on the line space lever. $l^3$ represents the carriage driving spring drum, which has an internal operating spring, as usual, and is connected to the carriage as by a strap $l^4$.

Figure 3:
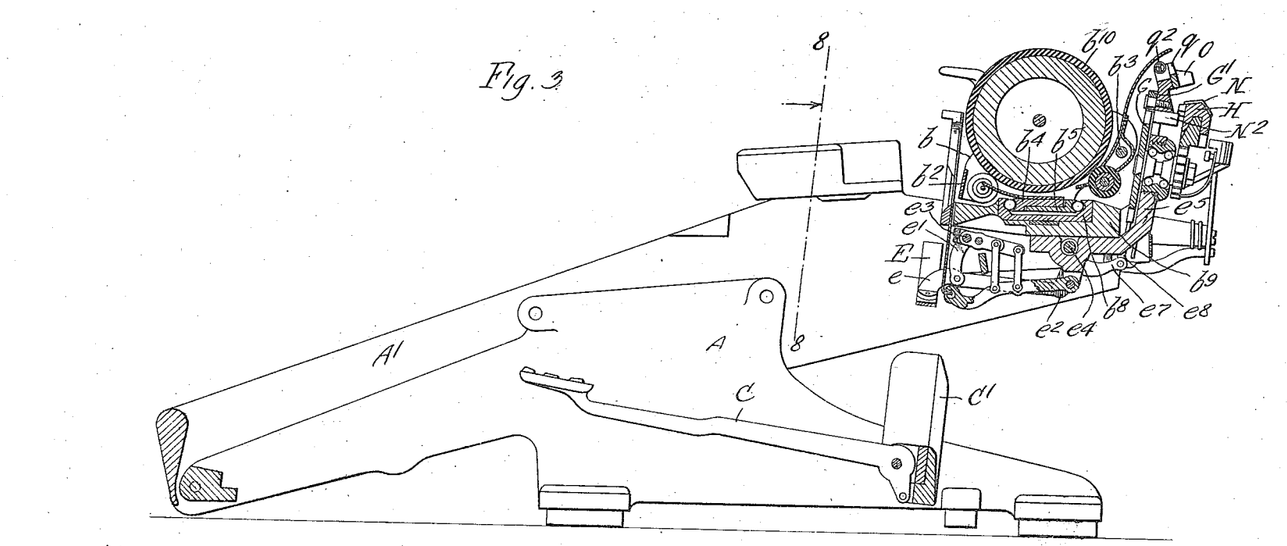
Fig. 3 is a longitudinal sectional elevation of the machine with the parts in their operative positions.
Figure 4:
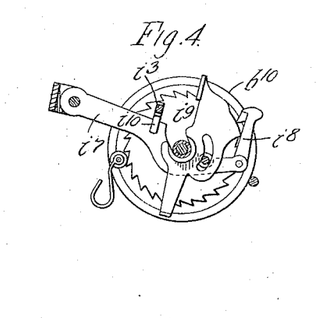
Fig. 4 is a cross sectional elevation of the platen carriage on line 4—4, Fig. 2.
Figure 5:
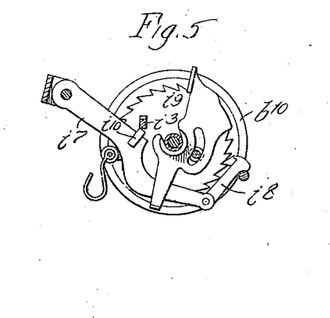
Fig. 5 is a similar view, showing the line space pawl at the end of its throw.
Figure 9:
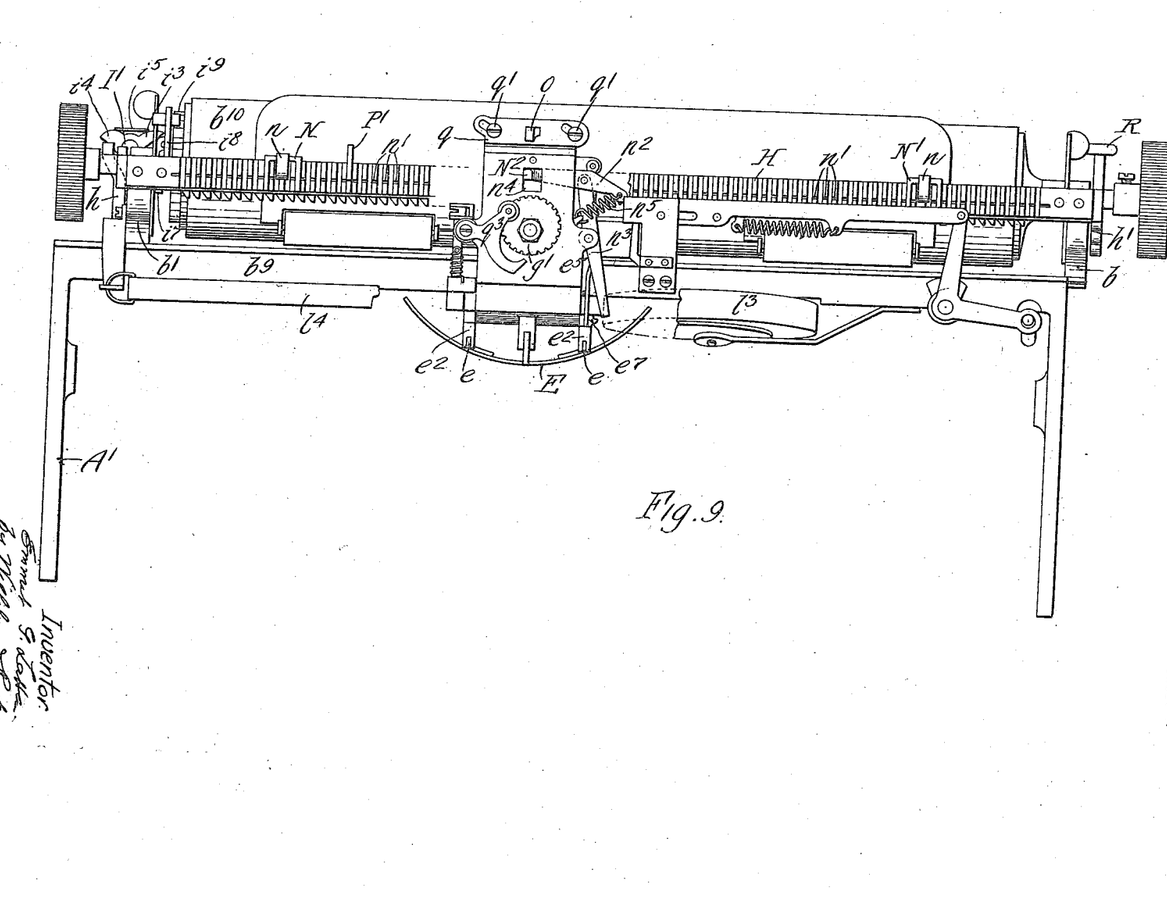
Fig. 9 is a fragmentary rear elevation of the machine, parts of the carriage escapement being removed to disclose the parts in front thereof.

N and N', Figs. 3, 7 and 9, represent two margin stops mounted on the rack bar H, and $N^2$ is a center stop or abutment against which the margin stops are adapted to strike to limit the travel of the carriage in both directions. The margin stops straddle the rack bar, having legs entering the slots in the front and rear faces of the bar, whereby they are held from movement longitudinally on the bar, and each stop is provided with a spring clip $n$, the free end of which is adapted to snap into notches $n'$ in the teeth on the rear side of the bar to releasably retain the stop in position. The margin stops are, as usual, adjustable to different positions on the rack bar.

The center stop $N^2$ is formed by a rearward projection on a lever $n^2$, Fig. 9, which is pivoted between its ends to the upper end of an upright lever $n^3$. The lever $n^2$ is located in a recess in the front side of the bracket $e^5$ and the stop $N^2$ projects from the lever rearwardly through the rectangular opening $n^4$ in the bracket with its rear end extending into the path of forwardly projecting portions of the margin stops. $n^5$ is a spring connected to the outer end of the lever $n^2$ and to the bracket $e^5$, and acting to yieldingly hold the center stop $N^2$ in the position shown in Fig. 9. The opening $n^4$ of the bracket permits the stop to move one letter space to the left (right in Fig. 9) after it intercepts the margin stop N, and after such movement to resist any further movement of the carriage. This movement of the stop $N^2$ swings the upper end of the upright lever $n^3$ to the left and places the lower end of the lever over the rearwardly projecting end of the arm $e^7$, connected to the universal bar, and thus locks the universal bar and escapement from action, or locks the line, as it is technically termed. By raising the rack bar until the margin stop N clears the center stop, the spring $n^5$ will move the center stop back to its normal position and then by permitting the rack bar to resume its normal position in mesh with the feed pinion, the line may be continued until the carriage reaches the end of its travel, if so desired. When the center stop $N^2$ returns to the normal position, above mentioned, it will rest under the margin stop N, and as the actuating spring $h^5$ for the rack bar is stronger than the stop actuating spring $n^5$, the center stop will be depressed by the margin stop into the lower part of the opening $n^4$, but as soon as the carriage moves in either direction far enough for the margin stop to clear the center stop, the latter will return to its normal elevation. The forwardly projecting part of the margin stop N is made with an upwardly and outwardly inclined lower face $n^6$ shown in Fig. 8, to permit it to pass over the center stop when the carriage is set back for a new line, if it has been moved to the other side of the stop. The other margin stop N' is preferably made with a similar but oppositely inclined face, so that after this stop has been set for writing on the margin of the paper, it will not stop the carriage in its travel to the left.

C represents a main stop for tabulating, which is adapted to intercept any one of a series of stops P P' which are adjustably placed on the rack bar, and as many of these adjustable stops may be used as desired. The traveling stops shown are provided with legs which straddle the rack bar in the notches therein and project upwardly from the rack bar. The main stop O is so located that the rack bar has to be raised about twice as far when tabulating as for simply releasing the margin stops from the center stop. This additional movement of the rack bar is made by rocking the line space lever I to a correspondingly greater distance. By rocking the line space lever the proper distance to release the rack bar from the feed pinion, the carriage can be allowed to move to the left past the first or any desired number of the tabulator stops P P' and the selected stop then caused to engage the main stop O to stop the carriage by giving the line space lever the necessary additional movement to raise the rack bar to the limit of its upward movement; or by simply rocking the line space lever to its limit the first stop P on the rack bar will engage the main stop O. This construction thus provides for either the ordinary column stop or selective stop systems of tabulating. It is not so rapid as a selective stop system having a series of separate keys, but it accomplishes the purpose within a space that does not admit of a series of separate stop keys, and it does not require a carriage retarding device, thereby further economizing room and expense.

The main tabulating stop O is rigidly connected to or formed with a plate $q$ which is secured to the upper end of the bracket $e^5$ by screws $q'$, Fig. 9, passing through inclined slots in the plate. A spring $q^2$ connected to the plate $q$ and to the bracket acts to retain the stop normally in the elevated position shown. When one of the adjustable tabulating stops strikes the stop O the stop plate is moved to the left and downwardly, so that the rack bar will, when the line space lever is released, reëngage the feed pinion before the adjustable stop is disengaged from the main stop O. This permits the line space lever to be released as soon as the adjustable stop strikes the stop O without danger of farther movement of the carriage.

$q^3$ represents a bell crank lever which is pivotally mounted on the rear side of the bracket $e^5$, see Fig. 9, and has an upper arm provided with a roller adapted to travel on the under side of the rack bar in rear of the rack teeth, when the rack bar is in its normal feeding position. When the rack bar is raised to release the carriage, a concealed spring swings the bell crank lever upwardly and a tooth on its lower arm enters between two adjacent teeth of the feed pinion and locks the pinion and carriage escapement from movement, so that when the rack bar is released it will properly engage the feed pinion.

Figure 6:
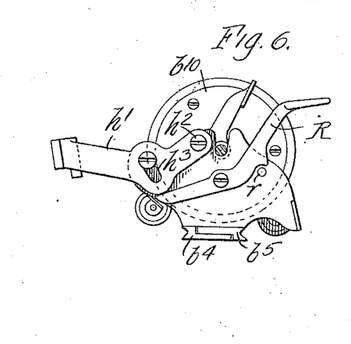
Fig. 6 is an end elevation partly in section on line 6—6, Fig. 2.

R represents an auxiliary carriage release lever which is pivoted on the left hand end of the carriage and is adapted to engage the rack supporting lever $h'$ for lifting the rack to permit either margin stop to pass the center stop. A pin $r$, Fig. 6, limits the downward movement of the auxiliary release lever, so that the rack cannot be raised by this lever high enough to cause the adjustable stops P P' to engage the tabulating stop O.

In the preferred construction, as shown, the auxiliary release lever R will ordinarily be used to release the carriage, or line lock, as the tabulator stops cannot be brought into action by that lever, but the line space lever can be used for releasing the carriage, and line lock, as well as for tabulating, and after a little practice, the operator learns to move the line space lever the limited distance required for this purpose without bringing the tabulating mechanism into action.

From the above, it will be seen that a line space lever of popular form and movement, and the rack bar, have been combined with other parts in such manner that the line space lever is used to actuate a series of tabulator stops, either successively or selectively at will, and also to release the carriage from its margin stops, or line lock, in addition to its use for line spacing and returning the carriage for the next line.

I claim as my invention:—

1. In a typewriting machine, the combination of a platen carriage, a support for the carriage, a main stop on the support, a carriage feed rack bar mounted on the carriage having a plurality of stops, and a forwardly extending line space lever traveling with the carriage and acting when moved in one direction to aline the rack bar stops with the main stop.

2. In a typewriting machine, the combination of a platen carriage, a carriage escapement, a carriage feed rack bar having a plurality of tabulating stops, a support for the carriage, a main stop on the support, and a forwardly extending line space lever mounted on the carriage and connections whereby said lever acts when moved in one direction to release the rack bar from the escapement and aline the rack bar stops with the main stop.

3. In a typewriting machine, the combination of a platen carriage, a carriage support, a carriage-feed rack bar mounted on the carriage, two sets of stops arranged on the rack bar, and two relatively fixed stops for coöperation with said sets of stops arranged so that when either set of rack bar stops is adjusted to coöperate with its coöperating stop the other set of rack bar stops cannot be intercepted by its coöperating stop.

4. In a typewriting machine, the combination of a platen carriage, a feed rack bar for said carriage, margin stops and tabulator stops mounted on said rack bar, relatively stationary stops for coöperation with the margin stops and tabulator stops, and means mounted on the carriage for actuating said rack bar to place either the margin stops or tabulator stops in operative relation with their coöperating stop.

5. In a typewriting machine, the combination of a platen carriage, a carriage escapement, a rack bar controlled by said escapement, margin stops on said rack bar, a coöperating stop adapted to be engaged by said margin stops, tabulator stops mounted on said rack bar, a stop for coöperation with said tabulator stops, and means traveling with the rack bar for moving said bar to free it from the escapement and place the tabulator stops thereon in position to engage said coöperating stop.

6. In a typewriting machine, the combination of a platen carriage and platen, a rack bar having tabulating stops, a relatively fixed coöperating stop, a feed pinion meshing with the rack bar, and a line space lever and connections for turning the platen, said line space lever being adapted by movement thereof to release the rack bar from the feed pinion and place the rack bar stops in line with their coöperating stop.

7. In a typewriting machine, the combination of a platen carriage and platen, a carriage-feed rack bar having tabulator stops arranged thereon between the ends of the bar, margin stops mounted outside of the tabulator stops on the rack bar, means for coöperation with said margin and tabulator stops for stopping the carriage, a feed pinion meshing with the rack bar, and a line space lever and connections for turning the platen, said lever acting to release the rack bar from the feed pinion with its initial movement and with its continued movement to cause the tabulator stops to act.

8. In a typewriting machine, the combination of a platen carriage and platen, a rack bar, tabulator stops, and margin stops mounted thereon, means for coöperation with said margin and tabulator stops for stopping said carriage, a feed pinion normally meshing with the rack bar, a line lock actuated by one of said margin stops, and a line space lever and connections for turning the platen, said lever acting to unlock the line lock and margin stop with its initial movement and to cause the tabulator stops to act with its continued movement.

9. In a typewriting machine, the combination of a platen carriage and platen, a rack bar having tabulator stops and margin stops mounted thereon, a feed pinion normally meshing with the rack bar, a line lock normally actuated by one of the margin stops, a relatively fixed main tabulator stop, and a line space lever, and connections for turning the platen, said lever acting by its movement in the direction of the letter space movement of the carriage to unlock the line and place the rack bar tabulator stops in line with the main tabulator stop.

10. In a typewriting machine, the combination of a platen carriage, a carriage feed-rack bar having margin and tabulator stops mounted thereon, a relatively fixed main stop to intercept the tabulator stops, and a forwardly projecting lever mounted on the carriage acting with its initial movement to release the margin stops, and with its complete movement in the same direction to cause the rack bar tabulator stops to engage with the main stop.

11. In a typewriting machine, the combination of a platen carriage, a carriage-feed rack bar having tabulator and margin stops mounted thereon, relatively fixed stops for coöperation with said tabulator and margin stops, a line lock actuated by the margin stops, and a forwardly extending lever mounted on the carriage and acting with its initial movement to unlock the line and release the margin stop if either be engaged, and with its complete movement in the same direction to cause the tabulator stops to engage with the coöperating stop.

12. In a typewriting machine, the combination of a platen carriage, a carriage-feed rack bar having tabulator stops thereon mounted on the carriage, a relatively fixed main tabulating stop, a line space mechanism for the platen including a line space lever adapted to be actuated at will to rotate the platen, or cause the tabulator stops on the rack bar to engage the main tabulating stop.

13. In a typewriting machine, the combination of a platen carriage and platen, a carriage-feed rack bar supporting a plurality of stops mounted on the platen carriage, a relatively fixed coöperating stop, and line space mechanism, including an operating lever adapted to actuate the tabulator stops either successively or selectively at will.

14. In a typewriting machine, the combination of a platen carriage and platen, a carriage-feed rack bar supporting a plurality of tabulating stops mounted on the carriage, a relatively fixed main stop, an escapement for the carriage, line space mechanism including an operating part acting when moved in one direction to rotate the platen and return it for a new line, and when moved in another direction to release the carriage from the escapement and place it under direct control of said operating part.

15. In a typewriting machine, the combination of a platen carriage and platen, a carriage-feed rack bar supporting a plurality of tabulating stops mounted on the carriage, a relatively fixed coöperating stop, a carriage escapement, line spacing mechanism including a lever acting when moved in one direction to rotate the platen and return the carriage for a new line, and when moved in another direction to release the carriage and place the rack bar tabulator stops in line with the coöperating stop.

16. In a typewriting machine, the combination of a platen carriage, a carriage-feed rack bar supporting a plurality of tabulating stops mounted on the carriage, a relatively fixed coöperating stop, a carriage driving spring, a carriage escapement, and a lever traveling with the carriage by which the operator may place the rack bar tabulator stops in line with the coöperative stop either successively or selectively, and control the movement of the carriage when moved by the driving spring from one position to another.

17. In a typewriting machine, the combination of a platen carriage, a carriage-feed rack bar having tabulating and margin stops thereon supported by the carriage, a relatively stationary main stop arranged to intercept the rack bar stops and to be moved thereby a limited distance transversely of the direction of movement of the carriage.

18. In a typewriting machine, the combination of a platen carriage, a carriage-feed rack bar having tabulating stops thereon supported by the carriage, a relatively stationary main stop arranged to intercept the rack bar stops and to be moved a limited distance by said stops both in the direction of the carriage movement, and transversely thereof.

19. In a typewriting machine, the combination of a platen carriage, a carriage-feed rack bar having tabulating stops thereon supported by the carriage, a relatively stationary main stop arranged to intercept the rack bar stops and to slide a limited distance therewith in an oblique direction.

20. In a typewriting machine, the combination of a platen carriage, a carriage feed rack bar having tabulator and margin stops thereon mounted on the carriage, a line space lever acting when moved to rotate the platen, and move the rack bar to release the margin stops, or to cause operative action of the tabulator stops, and an auxiliary lever acting to release the margin stops without causing operative action of the tabulator stops.

21. In a typewriting machine, the combination of a platen carriage, a rack bar provided with tabulator stops, a feed pinion normally meshing with said rack bar for controlling the movement of the carriage, a main stop, and means for moving said rack bar transversely thereof to disengage it from said pinion and place said tabulator stops in position to be intercepted by said main stop, said main stop being moved transversely of the rack bar toward said pinion when struck by a tabulator stop to retain the stops in engagement until the rack bar is reëngaged with the feed pinion.

22. In a typewriting machine, the combination of a platen carriage, a rack bar provided with tabulator stops, a feed pinion normally meshing with said rack bar for controlling the movement of the carriage, a main stop, and means for moving said rack bar transversely thereof to disengage it from said pinion and place said tabulator stops in position to be intercepted by said main stop, and a device normally held inactive by said rack bar which locks said pinion when the rack bar is disengaged therefrom.

23. In a typewriting machine, the combination of a platen carriage, a support therefor, means for moving the carriage for letter spacing, a stop carrier, a set of margin stops and a set of tabulator stops on the stop carrier, two relatively fixed main stops for coöperation with the said sets of margin and tabulator stops, said main stops being in different planes and arranged so that when either set of margin or tabulator stops is adjusted to coöperate with its main stop the other set of stops cannot be intercepted by its coöperating main stop, and means for adjusting the stop carrier toward and from one of the main stops.

24. In a typewriting machine, the combination of a platen carriage, letter spacing means for said carriage, a stop carrier on said carriage, margin and tabulator stops mounted on said carrier, relatively stationary main stops for coöperation with the margin stops and tabulator stops, said main stops being in different planes, and means for adjusting the stop carrier toward and from the main tabulator stop, said adjusting means moving the margin stops out of and into the path of the main margin stop.

25. In a typewriting machine, the combination of a platen carriage, a rack bar having tabulator and margin stops thereon the tabulator stops extending above the rack bar and the margin stops extending forward therefrom, a feed pinion meshing with the rack bar, a line space mechanism for the platen including a rotatable line space lever, means operated through the rotation of said lever to release the rack bar from the feed pinion and to lift the rack bar to bring the tabulator stops into operative position, and a relatively fixed main stop arranged to coöperate with the tabulator stops.

26. In a typewriting machine, the combination of a platen carriage, a carriage feed rack bar having tabulator stops thereon, and a main stop arranged to yieldingly intercept the rack bar stops and to be moved downwardly by said stops and to return to normal position when released from said rack bar stops.

27. In a typewriting machine, the combination of a platen carriage, a rack bar having tabulator stops thereon, a feed pinion normally meshing with the rack bar and a main stop adapted to intercept the rack bar stops and to move downwardly and laterally therewith and to retain its engagement with said rack bar stop until the rack bar is reengaged by the feed pinion.

28. In a typewriting machine, the combination of a platen carriage, a support for the carriage, a main stop on the support, a carriage feed rack bar mounted on the carriage and having a plurality of tabulator stops, and a forwardly extending rotatable line space lever traveling with the carriage and acting when rotated in one direction to aline the rack bar stops with the main stop.

29. In a typewriting machine, the combination of a platen carriage, a carriage feed rack bar, tabulator stops thereon, and a main stop normally out of the path of the tabulator stops, means for alining the tabulator stops with said main stop, and means to permit the main stop to yield and to automatically move into the normal path of the tabulator stops, said means returning the said main stop to its normal position when released from the tabulator stops.

30. In a typewriting machine, the combination of a platen carriage, a rack bar mounted thereon, margin stops on said rack bar, an escapement mechanism, a movable main stop adapted to be engaged by the margin stops, means operated through said movable main stop to lock the escapement mechanism when said stop is engaged by a margin stop, and a line space lever and connections for turning the platen, said lever acting by its movement in one direction to release the margin stop from the main stop and thereby unlock the line.

31. In a typewriting machine, the combination of a platen carriage, a support for the carriage, a movable main stop on the support, a carriage feed rack bar mounted on the carriage and having a plurality of stops adapted to engage the movable main stop, means operated through said movable main stop to lock the carriage when said main stop is engaged by one of the rack bar stops, and a line space lever mounted on and moving with the carriage and acting when moved in one direction to aline the rack bar stops with the main stop.

32. In a typewriting machine, the combination of a platen carriage, a support for the carriage, a movable main stop on the support, a stop carrier on said carriage and having a plurality of stops adapted to engage the movable main stop, means operated through said movable main stop to lock the carriage when said main stop is engaged by one of the stops on the stop carrier, and a line space lever mounted on and moving with the carriage and acting when moved in one direction to aline the stops on the carrier with the main stop.

33. In a typewriting machine, the combination of a platen carriage, a support for the carriage, a movable main stop on the support, a carriage feed rack bar mounted on the carriage and having a plurality of stops adapted to engage the movable main stop, means operated through said movable main stop to lock the carriage when said main stop is engaged by one of the rack bar stops, and means mounted on and moving with the carriage for alining the rack bar stops with the main stop.

Witness my hand this 2nd day of October, 1915.

EMMIT G. LATTA.

Witnesses:
  H. I. LATTA,
  L. B. LATTA.